United States Patent [19]

Javora et al.

[11] 4,220,585

[45] Sep. 2, 1980

[54] DRILLING FLUID ADDITIVES

[75] Inventors: Paul H. Javora; Bethel Q. Green, both of Houston, Tex.

[73] Assignee: Dresser Industries, Inc., Dallas, Tex.

[21] Appl. No.: 27,189

[22] Filed: Apr. 4, 1979

Related U.S. Application Data

[63] Continuation-in-part of Ser. No. 903,281, May 5, 1978, abandoned.

[51] Int. Cl.$^2$ .......................... C07G 1/00; C09K 7/00
[52] U.S. Cl. .......................... 260/124 R; 252/8.5 A; 252/8.5 C
[58] Field of Search .................... 260/124; 252/8.5 A, 252/8.5 C

[56] References Cited

U.S. PATENT DOCUMENTS

| 4,069,217 | 1/1978 | Detroit et al. | 260/124 R |
| 4,088,640 | 5/1978 | Detroit | 260/124 R |

Primary Examiner—Delbert R. Phillips
Attorney, Agent, or Firm—Robert W. Mayer; John N. Hazelwood

[57] ABSTRACT

A drilling fluid additive effective as a viscosity controlling agent is composed of complex titanium or zirconium lignosulfonates and/or salts of lignosulfonic acid. Alternatively, the additive may be a titanium-iron lignosulfonate and/or salt or lignosulfonic acid or a zirconium-iron lignosulfonate and/or salt of lignosulfonic acid. The additive is effective with the lignin component of the lignosulfonate being in either oxidized or unoxidized form.

12 Claims, No Drawings

DRILLING FLUID ADDITIVES

RELATED APPLICATIONS

This application is a continuation-in-part of copending application Ser. 903,281 filed May 5, 1978, now abandoned, entitled "Drilling Fluid Additives".

BACKGROUND OF THE INVENTION

This invention relates to improved additives for drilling fluids used in the drilling of oil and gas wells.

The most commonly used drilling fluids are aqueous dispersed clay such as bentonite, illite, kaolinite and other similar materials. These slurries frequently include caustic soda and a dispersant to form a fresh water based fluid, lime and a dispersant to form a lime-based fluid, or calcium sulfate, caustic soda, and a dispersant to form a gyp-type fluid. Sea water may be used as the liquid phase of a well fluid and any or all of the above-mentioned materials may be used in preparing sea water muds. These well fluids or drilling muds are often weighted with a finely ground mineral which has a high specific gravity and is relatively inert. Ground barite is used commonly in making high weight muds which are often required to overcome high pressures that are encountered in the formations penetrated during the drilling of oil and gas wells. High weight drilling fluids must be controlled within relatively narrow limits so as to allow trouble-free drilling of deep, high-pressure wells. Highly weighted drilling fluids are costly and the deep wells in which they are used are very expensive. Because of this and also because of the exacting control that is required, improved chemicals are needed for preparing and drilling with these fluids.

A well fluid for use in rotary drilling must have sufficient viscosity that it easily carries rock chips and material loosened by the drill bit out to the surface of the ground by flow of the fluid and it should be thixotropic so that when drilling is stopped at any time, the fluid will gel and prevent chips from settling around the drill bit.

The apparent viscosity or resistance to flow of drilling muds is the result of two properties, plastic viscosity and yield point. Each of these two properties represents a different source of resistance to flow. Plastic viscosity is a property related to the concentration of solids in the fluid, whereas yield point is a property related to the interparticle forces. Gel strength, on the other hand, is a property that denotes the thixotropy of mud at rest. The yield point, gel strength, and, in turn, the apparent viscosity of the mud, commonly are controlled by chemical treatment with materials such as complex phosphates, alkalies, mined lignites, plant tannins, and modified lignosulfonates. It has been found that chromium modified lignosulfonate as well as a mixed metal lignosulfonate of chromium and iron are highly effective in controlling the viscosity of drilling fluids. It now appears, however, that chromium compounds, particularly those in which chromium is present in the hexavalent form are considered toxic in nature. Therefore, various governmental authorities around the world have imposed or contemplate stringent controls upon the use of compounds containing chrome in oil and gas well drilling lest the fluids containing these agents inadvertently contaminate the environment. Although the chrome in the lignosulfonate is normally in the trivalent oxidation state, some governmental authorities have imposed stringent controls upon its use.

DESCRIPTION OF THE PRIOR ART

U.S. Pat. Nos. 2,935,473, 2,935,504, 3,087,923 and 3,168,511 all to Ellis Gray King and Carl Adolphson, disclose methods for the manufacture of iron, chromium, aluminum and copper lignosulfonates as well as mixtures thereof and the use of these materials as thinners and viscosity controlling additives for clay-based drilling fluids. They also disclose processes for oxidation of the lignin component of the lignosulfonate material generally starting with lignin liquors obtained from the pulping of wood as well as the advantages in such oxidized lignosulfonates of the particular cations disclosed as well fluid additives.

SUMMARY OF THE INVENTION

According to this invention, improved viscosity controlling additives for drilling fluids are composed of complex lignosulfonates containing titanium and/or zirconium. Commercially available zirconium compounds typically contain a small percentage of hafnium. The additives of this invention are in many cases more effective viscosity controlling agents than the chromium or chromium iron lignosulfonates disclosed in the prior art and widely used in the drilling industry. They have the additional advantage of avoiding the toxic nature ascribed to chromium lignosulfonate. In alternate forms of the invention mixed metal forms of lignosulfonate are employed, specifically titanium or zirconium in combination with iron.

Generally, lignosulfonates in accordance with the present invention, are prepared by reacting lignin liquors obtained from the pulping of wood with salts of the desired metal or metals and when necessary, removing any precipitated material. When the material is to be oxidized, the oxidation can be any one of the process steps. If necessary, the product can be sulfonated to produce additional sulfonate groups in the product.

Because of the chemically complex nature of the lignin-sulfonated lignin material used in preparation of the compositions of this invention, their exact chemical composition is not readily ascertainable. That is, reference to these compositions as "lignosulfonates" does not imply a limitation to salts formed by base-exchange chemical reactions. They may also include chelates as well as other metal complexes.

As has been disclosed in the aforementioned King and Adolphson U.S. Pat. No. 3,087,923 for example, it has been found that the oxidation of spent sulfite liquor components obtained from the pulping of wood leads to modification of certain properties such as the thinning of reduction of the viscosity of clay suspensions and reduction of the gel-like properties of such suspensions. Therefore, it is desirable to employ such conventional oxidizing agents as hydrogen peroxide, ozone or electrolytic oxidation in treatment of lignin liquor and preparation of the compounds of this invention. These techniques are described in detail in the aforesaid U.S. Pat. No. 3,087,923.

Viscosity-controlling agents prepared by reacting lignosulfonate liquor with a zirconium salt or complex are found to be effective when the zirconium content of the product is from at least about 1% up to about 9%, by weight; the preferred zirconium content appears to be in the range of about 4% to about 6%, by weight. Incorporation of greater amounts of zirconium does not appear to improve the viscosity-controlling properties of the product. In the case of zirconium-iron materials, compositions containing from about 1% to about 3% iron, the total metal content (iron plus zirconium) of from about 4% to about 6% appear to be particularly effective. If the lignin component of the lignosulfonate is partly in oxidized form, it is preferred to employ about 1% to about 5%, by weight, of oxidant with the preferred amount being from about 3% to about 5%.

For the titanium lignosulfonate products, the titanium content should be from about 0.5% to about 5% with the preferred amount being from about 1.5% to about 3.5%. Preferably titanium-iron lignosulfonate materials contain from about 1% to about 3% iron with a total metal content (iron plus titanium) from about 2% to about 6%. Oxidized products in this case appear to be most effective when prepared by using from about 1% to about 6%, by weight, oxidant with the preferred amount being in the range of from about 2% to about 5%. An especially effective composition is a titanium-iron lignosulfonate containing 2.3%, by weight, of titanium and 1.5%, by weight, of iron. The lignin component of this particular composition was partially oxidized by the addition of 4.5%, by weight, of oxidant to the reaction mixture.

DETAILED DESCRIPTION OF THE INVENTION

In the following examples all measurements of the parameters apparent viscosity, plastic viscosity, yield point and gel strength were made in accordance with API Recommended Practice 13B Standard Procedure for Testing Drilling Fluids, 6th Edition published by the American Petroleum Institute, April 1976. The units in which the parameters are expressed are: apparent viscosity; centipoise (cps), plastic viscosity; centipoise (cps), yield point (lbs/100 ft$^2$); and gel strength (lbs/100 ft$^2$).

EXAMPLE 1

A solution of lignosulfonic acid was prepared from 834 grams of spent soft wood sulfite liquor (obtained from Consolidated Papers, Inc. and containing 55% by weight solids and 2% by weight calcium) diluted with 300 grams of water and 20 milliliters of concentrated sulfuric acid. This mixture was warmed to 140° F. for 3.5 hours and filtered to isolate the filtrate from the precipitated gypsum. To 351 grams of the resultant lignosulfonic acid solution, diluted with 100 grams of water, was added 47 grams of zirconium acetate-acetic acid solution containing the equivalent of 22% zirconium dioxide. After a 30-minute reaction time, 11.7 grams of hydrated ferric sulfate containing 78.5% Fe$_2$(SO$_4$)$_3$ was added, and dissolved in several hours. The pH was adjusted to 4.0 with 20% sodium hydroxide and the solution was spray dried to yield the brown solid powdered material composed of zirconium-iron lignosulfonate containing by weight 4.9% zirconium and 1.5% iron.

This material was then tested for viscosity controlling and dispersant and/or deflocculent properties by addition to a standard base drilling fluid prepared from clayey material containing 25%, by weight, sodium bentonite (montmorillonite), 50%, by weight, X-ACT clay (a calcium montmorillonite) and 25%, by weight, grundite. In each of these tests the zirconium-iron lignosulfonate was compared to a base mud made up by the use of 68 lbs/barrel of the clayey solids in water. Comparisons were made with mud to which no dispersant had been added, for example, to which 6 lbs/barrel of chromium lignosulfonate had been added and a sample to which 6 lbs/barrel of zirconium-iron lignosulfonate had been added. Each of the slurries tested was aged 18 hours at a temperature of 200° F. The results are given in Table I.

TABLE I

| | Apparent Viscosity | Plastic Viscosity | Yield Point | Gel 1 min. | Strength 10 min. |
|---|---|---|---|---|---|
| Base | 48 | 12 | 72 | 61 | 85 |
| Chromium Lignosulfonate | 13 | 10 | 6 | 6 | 10 |
| Zirconion-iron Lignosulfonate | 13 | 12 | 2 | 3 | 8 |

From the foregoing data it can be seen that the thinning and dispersant properties of zirconium-iron lignosulfonate compare favorably with those chromium lignosulfonates without the use of any chromium in the added material.

EXAMPLE 2

A stirred solution of 50 grams of water and 555 grams of spent sulfite liquor of the same origin as that used in Example 1 but containing 57.5% solids and 2% calcium was heated to 150° F. and acidified with 27.5 grams concentrated sulfuric acid. The temperature was maintained above 150° F. for 45 minutes before 97.5 grams zirconium acetate-acetic acid solution equivalent to 22% zirconium dioxide was added. This mixture was stirred 5 hours at a temperature above 150° F. and then filtered to isolate the filtrate from the precipitated gypsum. The pH of the filtrate was adjusted to 4.0 with 36.4 grams of 50% sodium hydroxide. Light brown powdered zirconium lignosulfonate containing 5.0%, by weight, of zirconium, was obtained from the spray dryer.

EXAMPLE 3

Spent sulfite liquor of the same type employed in Example 1 in the amount of 555 grams was diluted with 65 grams of water and heated to 164° F. Then 142 grams of titanium sulfate-sulfuric acid solution containing 5.4%, by weight, of titanium was added to the solution. After two hours, 24 grams of commercial iron sulfate hydrate containing 19.8% by weight, of iron was added and the temperature of the solution maintained at 160° for 1 hour. Excess sulfuric acid was partially neutralized with 20.3 grams of lime (92.7% calcium hydroxide) added as a slurry. The temperature of the mixture rose to 172° F. and was filtered after 45 minutes. The pH of the filtrate was then adjusted to 4.5 by the addition of 43.3 grams of 50% sodium hydroxide. The solution was spray dried to obtain a solid titanium-iron lignosulfonate in powdered form and containing 2.4%, by weight, of titanium and 1.5%, by weight, or iron.

This material was employed as a dispersant and tested in comparison with chrome lignosulfonate in a base mud. The 16 lb/gallon (ppg) base mud system contained 15 lbs/barrel (ppb) sodium bentonite, 5 ppb X-ACT clay, 5 ppb grundite, barite to weight to 16 ppg and 0.25 ppb sodium carbonate. The results shown in Table II are the initial room temperature data. The concentration of lignosulfonate was 6 ppb.

TABLE II

|  | Apparent Viscosity | Plastic Viscosity | Yield Point | Gel 1 min. | Strength 10 min. |
|---|---|---|---|---|---|
| Base | - Too thick to measure - | | | | |
| Chromium Lignosulfonate | 70 | 61 | 19 | 4 | 13 |
| Titanium-iron Lignosulfonate | 42 | 40 | 5 | 3 | 9 |

The same materials tested after heat aging 16 hours at 200° F. gave the following results:

TABLE III

|  | Apparent Viscosity | Plastic Viscosity | Yield Point | Gel 1 min. | Strength 10 min. |
|---|---|---|---|---|---|
| Base | 92 | 70 | 44 | 7 | 18 |
| Chromium Lignosulfonate | 71 | 64 | 14 | 3 | 4 |
| Titanium-iron Lignosulfonate | 62 | 58 | 9 | 3 | 5 |

Again, it can be seen that a dispersant prepared according to this invention, namely the titanium-iron lignosulfonate, was at least as effective a viscosity controlling agent as chromium lignosulfonate.

EXAMPLE 4

370 grams of the same spent sulfite liquor used in Example 1 was diluted with 60 grams of water and stirred with 45.5 grams of titanyl sulfate cake containing 11.9%, by weight, of titanium during which time the cake dissolved and gypsum was precipitated from the solution. Sixteen hours later the mixture was filtered. The pH of the filtrate was adjusted to 4.4 from 1.3 with 30 grams of 50% NaOH solution and spray dried to form a titanium lignosulfonate containing 2.5% titanium, by weight.

The viscosity controlling and dispersant properties of this product were demonstrated by comparing it with chromium lignosulfonate in a sea water mud system containing 150 ppb of the clayey material used on Example 1 mixed in Gulf Coast sea water. The test results after heat aging 16 hours at 200° F. are shown in Table IV.

TABLE IV

|  | Additive ppb | Apparent Viscosity | Plastic Viscosity | Yield Point | Gel 1 min. | Strength 10 min. |
|---|---|---|---|---|---|---|
| Base | | 60 | 13 | 94 | 74 | 86 |
| Chromium Lignosulfonate | 6 | 16 | 12 | 8 | 12 | 18 |
| Titanium Lignosulfonate | 6 | 18 | 11 | 14 | 14 | 17 |

EXAMPLE 5

Hardwood sulfite waste liquor in the amount of 491 grams containing 60.5% solids and 2.3% calcium was mixed with 60 grams of $H_2O$ and 133 grams of titanyl sulfate-sulfuric acid solution containing 5.4% titanium. After two hours, 18.2 grams 30% hydrogen peroxide in 15 grams water was added, causing the temperature to increase to 120° F. When the temperature decreased to 110°, 30 grams of lime suspended in 55 grams water was added, again causing the temperature to increase. After several hours the mixture was filtered and the pH of the filtrate adjusted to 4.0 with 50% sodium hydroxide. The solution was spray dried to yield powdered oxidized titanium lignosulfonate containing 2.4% titanium.

Employing this oxidized titanium lignosulfonate as a dispersant, it was tested and compared with chromium lignosulfonate in a 12 ppg fresh water mud system containing 15 ppb sodium bentonite, 10 ppb grundite, 10 ppb X-ACT clay, a trace (0.25 ppb) of sodium carbonate and barite. The data reported in Table V were taken after heat aging the samples 16 hours at 200° F.

TABLE V

|  | Additive ppb | Apparent Viscosity | Plastic Viscosity | Yield Point | Gel 1 min. | Strength 10 min. |
|---|---|---|---|---|---|---|
| Base | | 88 | 56 | 68 | 32 | 97 |
| Chromium Lignosulfonate | 6 | 42 | 39 | 5 | 1 | 2 |
| Oxidized Titanium Lignosulfonate | 6 | 37 | 35 | 3 | 2 | 2 |

As can be seen again, a drilling mud additive prepared according to the above-described procedure is at least as effective as chromium lignosulfonate.

EXAMPLE 6

A solution containing 491 grams of the same liquor used in Example 5 and 65 grams of $H_2O$ was heated to 150° F. and then reacted for 45 minutes with 133 grams of titanyl sulfate-sulfuric acid solution containing 7.2 grams titanium. A suspension of 21 grams of lime in 50 grams of $H_2O$ was then added. The temperature had decreased to 115° when 18.2 grams of 30% hydrogen peroxide in 15 grams water was added, causing the temperature to increase to 140°. At 130°, 24 grams of commercial hydrated iron sulfate containing 19.8% iron was added. The mixture was stirred for 1.2 hours and then heated to 130°. An additional 21 grams of lime was added as a slurry and reacted one hour. The solution was filtered then, and 24.4 grams of 50% sodium hydroxide was added to the filtrate to adjust its pH to 4.0. The resultant material contained 2.4% titanium, by weight, and 1.5% iron, by weight.

This oxidized titanium-iron lignosulfonate was tested as a drilling mud additive and compared with chromium lignosulfonate in the same base mud as used in Example 5. The data reported below in Table VI are for the initial room temperature properties while the data reported in Table VII are after heat aging the samples 16 hours at 200° F.

TABLE VI

|  | Additive ppb | Apparent Viscosity | Plastic Viscosity | Yield Point | Gel 1 min. | Strength 10 min. |
|---|---|---|---|---|---|---|
| Base | | - Too thick to measure - | | | | |
| Chromium Lignosulfonate | 6 | 40 | 37 | 6 | 1 | 2 |
| Oxidized Titanium Iron-Lignosulfonate | 6 | 28 | 26 | 2 | 1 | 1 |

TABLE VII

| Additive ppb | Apparent Viscosity | Plastic Viscosity | Yield Point | Gel 1 min. | Strength 10 min. |
|---|---|---|---|---|---|
| Base | | 88 | 54 | 68 | 32 | 97 |
| Chromium Lignosulfonate | 6 | 42 | 39 | 5 | 1 | 2 |
| Oxidized Titanium Iron Ligno- | 6 | 35 | 33 | 3 | 1 | 1 |

Again, the effectiveness of a drilling fluid agent prepared according to this patent is clearly indicated above.

EXAMPLE 7

A solution containing 555 grams of the spent sulfite liquor used in Example 2 and 65 grams of water was heated to 156° F. and reacted one hour with 142 grams titanium sulfate-sulfuric acid solution containing 5.4%, by weight, titanium. During the next 40 minutes, 15 grams of 35% hydrogen peroxide in 15 grams of water was added such that the temperature remained below 170°. After the temperature decreased to 153°, this mixture was stirred for one hour with 24 grams of commercial hydrated iron sulfate containing 4.8 grams of iron. Next a slurry of 20.3 grams of lime in 50 grams of water was added and the temperature was maintained above 150° for 1.4 hours. The precipitated gypsum was removed by filtration and 49.6 grams of 50% sodium hydroxide was added to adjust the pH of the filtrate to 4.0. The oxidized titanium-iron lignosulfonate containing 14.% iron and 2.3% titanium was obtained as a brown powder by spray drying the treated filtrate.

The effectiveness of this oxidized titanium-iron lignosulfonate is demonstrated by the initial data shown in Table VIII and by the data taken after heat aging 16 hours at 200° F. shown in Table IX. The base mud is the same as used for Example 3.

TABLE VIII

| Additive ppb | Apparent Viscosity | Plastic Viscosity | Yield Point | Gel 1 min. | Strength 10 min. |
|---|---|---|---|---|---|
| Base | - Too thick to measure - | | | | |
| Chromium Lignosulfonate | 6 | 70 | 61 | 19 | 4 | 13 |
| Oxidized Titanium-Iron Lignosulfonate | 6 | 42 | 40 | 5 | 4 | 6 |

TABLE IX

| Additive ppb | Apparent Viscosity | Plastic Viscosity | Yield Point | Gel 1 min. | Strength 10 min. |
|---|---|---|---|---|---|
| Base | | 92 | 70 | 44 | 7 | 18 |
| Chromium Lignosulfonate | 6 | 71 | 64 | 14 | 3 | 4 |
| Oxidized Titanium-Iron Lignosulfonate | 6 | 60 | 55 | 10 | 4 | 4 |

EXAMPLE 8

Spent sulfite liquor of the type used in Example 2 containing 319 grams of solids in 640 grams of solution was acidified with 27.5 grams of concentrated sulfuric acid. After 50 minutes, 98 grams of zirconium acetate-acetic acid solution containing 16 grams of zirconium was added and stirred 3 hours. A solution of 18.5 grams 30% hydrogen peroxide in 15 grams of water was then added causing the solution colour to darken and the temperature to increase to over 100° F. This mixture was stirred for 2.5 hours and then filtered. The pH of the filtrate was adjusted to 4.0 with 38.3 grams of 50% sodium hydroxide. The oxidized zirconium lignosulfonate containing 5.0%, by weight, of zirconium, was obtained in powder form from the spray dryer.

EXAMPLE 9

Sulfite liquor by-product of the type used in Example 2 used in the amount of 555 grams was diluted with 70 grams of $H_2O$ and acidified by the addition of 12.5 grams of concentrated sulfuric acid. After one hour, 99 grams zirconium acetate-acetic acid solution containing the equivalent of 22% zirconium dioxide was added and the mixture was stirred 2.5 hours. Addition of 18.5 grams of 30% hydrogen peroxide in 15 grams of water caused a darkening of the solution colour and the temperature to increase to over 100° F. The temperature dropped to 95° after one hour and 24.2 grams commercial hydrated iron sulfate containing 4.8 grams of iron was then added. After an additional two hours, the filtrate was isolated and partially neutralized to pH 4.0 with 29.3 grams of 50% sodium hydroxide. The oxidized zirconium-iron lignosulfonate containing 5.2%, by weight, of zirconium and 1.5%, by weight, of iron, was obtained as a powder from the spray dryer.

The embodiments of the invention in which an exclusive property or privilege is claimed are defined as follows:

1. An additive for drilling fluids effective for dispersing clay in an aqueous medium consisting essentially of water-soluble lignosulfonate salt having a cation selected from the group consisting of zirconium, titanium, zirconium-iron mixture and titanium-iron mixture.

2. The drilling fluid composition according to claim 1 wherein a portion of the lignin component of the lignosulfonate salt is in oxidized form.

3. The drilling fluid composition according to claim 1 wherein the lignosulfonate salt is a zirconium lignosulfonate having a zirconium content of at least about 1% by weight.

4. The drilling fluid composition according to claim 1 wherein the lignosulfonate salt is a zirconium lignosulfonate having a zirconium content in the range of about 4.0% to 6.0%, by weight.

5. The drilling fluid composition according to claim 1 wherein the lignosulfonate salt has a mixed zirconium-iron cation, an iron content of from about 1.0% to about 3.0%, by weight, and a total metal content of from about 4.0% to about 6.0%, by weight.

6. The drilling fluid composition according to claim 1 wherein the lignosulfonate salt is a titanium lignosulfonate having a titanium content of at least about 0.5%, by weight.

7. The drilling fluid additive in accordance with claim 1, wherein the lignosulfonate salt is a titanium lignosulfonate having a titanium content of a range of from about 1.5% to about 3.5%, by weight.

8. The drilling fluid additive in accordance with claim 1 wherein the lignosulfonate salt has a mixed titanium-cation, an iron content of about 1.0% to about 3.0% by weight, and a total metal content of from about 2.0% to about 6.0%, by weight.

9. The drilling fluid additive in accordance with claim 1 wherein said cation is titanium.

10. The drilling fluid additive in accordance with claim 1 wherein said cation is zirconium.

11. The drilling fluid additive in accordance with claim 1 wherein said cation is a zirconium-iron mixture.

12. The drilling fluid additive in accordance with claim 1 wherein said cation is a titanium-iron mixture.

* * * * *